(12) United States Patent
Wang

(10) Patent No.: US 12,127,291 B2
(45) Date of Patent: Oct. 22, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/663,156

(22) Filed: May 12, 2022

(65) Prior Publication Data
US 2022/0272787 A1    Aug. 25, 2022

Related U.S. Application Data

(63) Continuation of application No. 17/347,310, filed on Jun. 14, 2021, now Pat. No. 11,363,667, which is a
(Continued)

(51) Int. Cl.
*H04W 76/27*    (2018.01)
*H04W 24/10*    (2009.01)
(Continued)

(52) U.S. Cl.
CPC .......... *H04W 76/27* (2018.02); *H04W 24/10* (2013.01); *H04W 76/19* (2018.02); *H04W 76/30* (2018.02)

(58) Field of Classification Search
CPC ..... H04W 76/27; H04W 24/10; H04W 76/19; H04W 76/30; H04W 24/08
See application file for complete search history.

(56) References Cited

U.S. PATENT DOCUMENTS 8,787,834 B2   7/2014  Lee
9,154,989 B2  10/2015  Lee et al.
(Continued)

FOREIGN PATENT DOCUMENTS

CN   101931981 A   12/2010
CN   102547826 A    7/2012
(Continued)

OTHER PUBLICATIONS

International Search Report in the international application No. PCT/CN2019/073526, mailed on Oct. 25, 2019.
Intel Corporation, "Next generation NR mobility management framework", 3GPP TSG RAN WG3 Meeting #92 R3-161083, Nanjing, China, May 23-27, 2016.
(Continued)

*Primary Examiner* — Will W Lin
(74) *Attorney, Agent, or Firm* — Perkins Coie LLP

(57) ABSTRACT

A method for wireless communication includes: entering, by a terminal device, a second state from a first state; when the terminal device stores first measurement configuration information used by the terminal device in the first state, releasing, reserving or updating, by the terminal device, the first measurement configuration information; and/or when the terminal device does not store the first measurement configuration information, obtaining, by the terminal device, second measurement configuration information used by the terminal device in the second state, wherein the first state is an idle state or an inactive state, the second state is any one of an idle state, an inactive state or a connected state, and the measurement configuration information is used by the terminal device to obtain a measurement result.

12 Claims, 13 Drawing Sheets

Related U.S. Application Data continuation of application No. PCT/CN2019/073526, filed on Jan. 28, 2019.

(51) Int. Cl.
*H04W 76/19* (2018.01)
*H04W 76/30* (2018.01)

(56) References Cited

U.S. PATENT DOCUMENTS

| | | | |
|---|---|---|---|
| 9,807,636 B2 | 10/2017 | Lee et al. | |
| 9,973,954 B2 | 5/2018 | Johansson | |
| 10,791,562 B2* | 9/2020 | Ryoo | H04W 72/0453 |
| 2011/0195668 A1 | 8/2011 | Lee et al. | |
| 2012/0088457 A1 | 4/2012 | Johansson | |
| 2014/0235271 A1* | 8/2014 | Jung | H04W 24/10 455/456.1 |
| 2014/0242974 A1 | 8/2014 | Lee et al. | |
| 2015/0373573 A1 | 12/2015 | Lee et al. | |
| 2017/0359747 A1* | 12/2017 | Lunden | H04L 5/0098 |
| 2018/0092155 A1* | 3/2018 | Hong | H04W 52/0254 |
| 2018/0270682 A1 | 9/2018 | Zacharias et al. | |
| 2018/0270894 A1* | 9/2018 | Park | H04W 36/02 |
| 2018/0302914 A1* | 10/2018 | da Silva | H04W 76/27 |
| 2019/0014492 A1 | 1/2019 | Kim et al. | |
| 2019/0021058 A1 | 1/2019 | Cheng et al. | |
| 2020/0029239 A1* | 1/2020 | Chen | H04W 76/19 |
| 2020/0120742 A1 | 4/2020 | Mildh et al. | |
| 2020/0128422 A1 | 4/2020 | Kim et al. | |
| 2020/0351689 A1* | 11/2020 | Bao | H04W 36/0072 |
| 2021/0029569 A1* | 1/2021 | Kim | H04W 76/27 |
| 2021/0120622 A1* | 4/2021 | Fujishiro | H04W 76/30 |
| 2021/0410216 A1* | 12/2021 | Liu | H04W 76/20 |
| 2022/0015131 A1* | 1/2022 | Cheng | H04W 36/00 |
| 2022/0116809 A1* | 4/2022 | Cheng | H04W 76/30 |

FOREIGN PATENT DOCUMENTS

| | | |
|---|---|---|
| CN | 107959983 A | 4/2018 |
| CN | 108235336 A | 6/2018 |
| CN | 108811008 A | 11/2018 |
| CN | 109150362 A | 1/2019 |
| JP | 2017-108413 A | 6/2017 |
| WO | 2017170159 A1 | 10/2017 |
| WO | 2018236172 A1 | 12/2018 |
| WO | 2019190383 A1 | 10/2019 |
| WO | 2020147771 A1 | 7/2020 |

OTHER PUBLICATIONS

Institute for Information Industry(III):"Handling of Lower Layer SCG Configuration in RRC INACTIVE"3GPP Draft; R2-1815204 Handling of Lower Layer Scg Configuration in RRC INACTIVE, 3rd Generation Partnership Projectmobile Competence Centre(3GPP) ,650, Route Desluciolesf-06921 Sophia-Antipol, vol. RAN WG2, No. Chengdu, China; Oct. 8, 2018Oct. 12, 2018 Sep. 28, 2018(Sep. 28, 2018),XP051524563,Retrieved from the Internet: URL:http://www.3gpp.org/ftp/tsg%5Fran/WG2%5FR.
Supplementary European Search Report in the European application No. 19912462.9, mailed on Dec. 7, 2021.
English translation of the Written Opinion of the International Search Authority in the international application No. PCT/CN2019/073526, mailed on Oct. 25, 2019. (13 pages).
Non-Final Office Action of the U.S. Appl. No. 17/347,310, issued on Oct. 26, 2021.
Notice of Allowance of the U.S. Appl. No. 17/347,310, issued on Feb. 16, 2022.
Corrected Notice of Allowability of the U.S. Appl. No. 17/347,310, issued on Mar. 9, 2022.
Second Office Action of the Chinese application No. 202110302951.4, issued on Oct. 24, 2022. 12 pages with English translation.
OPPO, "Discussion on measurement configuration enhancement in INACTIVE state", 3GPP TSG RAN WG2 #99 R2-1708367, Aug. 11, 2017. 5 pages.
Ericsson, "Measurement configurations and signaling for fast setup", 3GPP TSG RAN WG2adhoc_2018_01_NR R2-1801017, Jan. 12, 2018. 3 pages.
3GPP, 3rd Generation Partnership Project; Technical Specification GroupRadio Access Network; NR; Radio Resource Control (RRC) protocol specification (Release 15), 3GPP TS 38.331 V15.4.0(Dec. 2018), Jan. 14, 2019, pp. 64-69. 474 pages.
First Office Action of the Japanese application No. 2021-543380, issued on Dec. 13, 2022. 16 pages with English translation.
First Office Action of the Chinese application No. 202110302951.4, issued on Jul. 20, 2022. 25 pages with English Translation.
First Office Action of the European application No. 19912462.9, issued on Jun. 29, 2022. 5 pages.
Office Action of the Indian application No. 202117036494, issued on May 30, 2022. 5 pages with English Translation.
First Office Action of the Korean application No. 10-2021-7027363, issued on Jun. 17, 2024. 18 pages with English translation.
3GPP TS 36.331 v. 14.8.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 14). pp. 106-150.

\* cited by examiner

WIRELESS COMMUNICATION METHOD, TERMINAL DEVICE, AND NETWORK DEVICE

CROSS-REFERENCE TO RELATED APPLICATIONS

The application is a continuation application of U.S. patent application Ser. No. 17/347,310 filed on Jun. 14, 2021, which is a continuation application of PCT Application No. PCT/CN2019/073526 filed on Jan. 28, 2019, the disclosure of which is hereby incorporated by reference in its entity.

BACKGROUND

Carrier Aggregation (CA) technology makes it possible for a terminal device to use multiple component carriers to simultaneously transmit and receive data, which increases data transmission rate, and improves working efficiency of a system. In a New Radio (NR) communication system, dual connection (DC) scenarios can be supported.

However, in long term evolution (LTE), measurement configuration information used to assist a network device to perform CA and Multi-RAT Dual Connectivity (MR-DC) configuration does not support an inactive state, but the inactive state exists in NR.

At present, when a terminal device enters an idle state or a connected state from the inactive state, how the terminal device processes the measurement configuration information used when the terminal device is in an inactive state, and an occasion for the terminal device to stop measurement are not specified in the related art. Furthermore, after the state transition, how the UE obtains the measurement configuration after releasing original configuration also needs to be clarified.

SUMMARY

The embodiments of the present disclosure relate to the field of communications, and more particularly, to a method for wireless communication, a terminal device, and a network device.

Provided are a method for wireless communication, a terminal device and a network device. When the terminal device enters a second state from a first state, second measurement configuration information used by the terminal device in the second state can be effectively maintained or obtained, thus the validity of the measurement configuration can be ensured, and then the optimal measurement result can be provided for the network device, which can effectively shorten the time delay of CA and MR-DC configuration, and improve the system capacity and the data transmission rate of the terminal device.

In a first aspect, there is provided a method for wireless communication, including: entering, by a terminal device, a second state from a first state; when the terminal device stores first measurement configuration information used by the terminal device in the first state, releasing, reserving or updating, by the terminal device, the first measurement configuration information; and/or when the terminal device does not store the first measurement configuration information, obtaining, by the terminal device, second measurement configuration information used by the terminal device in the second state, herein the first state is an idle state or an inactive state, the second state is any one of an idle state, an inactive state or a connected state, and the measurement configuration information is used by the terminal device to obtain a measurement result.

In a second aspect, there is provided a method for wireless communication, including: controlling, by a network device, a terminal device to enter a second state from a first state; generating and sending, by the network device, first indication information, herein the first indication information is used to instruct the terminal device to release first measurement configuration information used by the terminal device in the first state, herein the first state is an idle state or an inactive state, the second state is any one of an idle state, an inactive state or a connected state, herein the measurement configuration information is used by the terminal device to obtain a measurement result.

In a third aspect, there is provided a terminal device, including: a memory storing processor-executable instructions; and a processor configured to execute the stored processor-executable instructions to perform operations of: entering a second state from a first state; when the terminal device stores first measurement configuration information used by the terminal device in the first state, releasing, reserving or updating the first measurement configuration information; and/or when the terminal device does not store the first measurement configuration information, obtaining second measurement configuration information used by the terminal device in the second state, herein the first state is an idle state or an inactive state, the second state is any one of an idle state, an inactive state or a connected state, wherein the measurement configuration information is used by the terminal device to obtain a measurement result.

DETAILED DESCRIPTION

Figure 1:
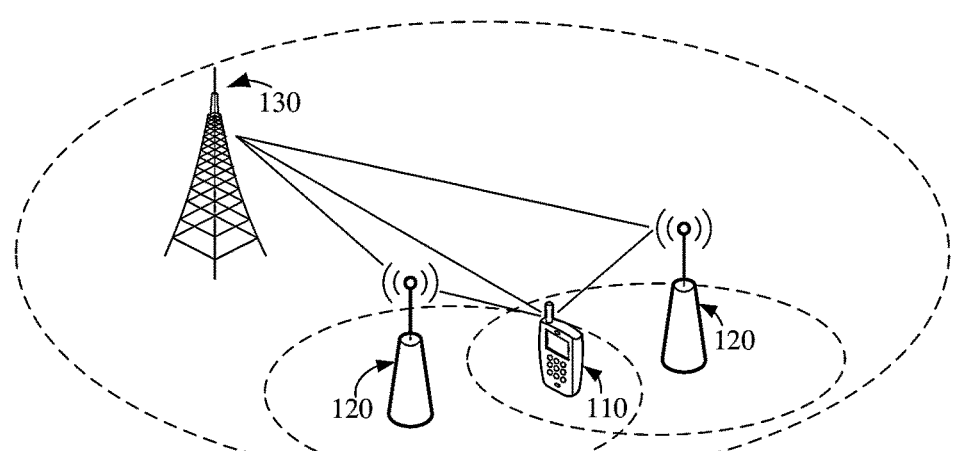
FIG. 1 is a schematic diagram of a communication system architecture provided by an embodiment of the present disclosure.

FIG. 1 is a schematic diagram of a system 100 according to an embodiment of the present disclosure.

As shown in FIG. 1, a terminal device 110 is connected to a first network device 130 in a first communication system and a second network device 120 in a second communication system. For example, the first network device 130 is a network device in a Long Term Evolution (LTE), and the second network device 120 is a network device in a New Radio (NR).

There are multiple cells under the first network device 130 and the second network device 120.

It should be understood that FIG. 1 is an example of a communication system according to an embodiment of the present disclosure, and the embodiment of the present disclosure is not limited to that shown in FIG. 1.

As an example, the communication system to which the embodiment of the present disclosure is adapted may include at least multiple network devices under the first communication system and/or multiple network devices under the second communication system.

For example, the system 100 shown in FIG. 1 may include one main network device under the first communication system and at least one secondary network device under the second communication system. At least one secondary network device is respectively connected to the one main network device to form multiple connections, and is respectively connected to the terminal device 110 to provide services for it. Specifically, the terminal device 110 may simultaneously establish a connection through the main network device and the secondary network device.

Optionally, a connection established between the terminal device 110 and the main network device is a main connection, and a connection established between the terminal device 110 and the secondary network device is a secondary connection. A control signaling of the terminal device 110 may be transmitted through the main connection, while data of the terminal device 110 may be transmitted through the main connection and the secondary connection simultaneously, or may be transmitted only through the secondary connection.

As another example, the first communication system and the second communication system in the embodiments of the present disclosure are different, but the specific type of the first communication system and the second communication system is not limited.

For example, the first communication system and the second communication system may be various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Time Division Duplex (TDD), and an Universal Mobile Telecommunication System (UMTS), etc.

The main network device and the secondary network device may be any access network device.

According to some implementations, in some embodiments, the access network device may be a base station (Base Transceiver station, BTS) in the Global System of Mobile Communication (GSM) system or the Code Division Multiple Access (CDMA). Station, BTS), a base station (NodeB, NB) in the Wideband Code Division Multiple Access (WCDMA) system, or an evolutional base station (Evolutional Node B, eNB or eNodeB) in the Long Term Evolution (LTE) system.

According to some implementations, the access network device may also be a next generation radio access network (NG RAN), a base station (gNB) in an NR system, or a wireless controller in a cloud radio access network (CRAN). Or, the access network device can be a relay station, an access point, an in-vehicle device, a wearable device, or a network device in a future-evolutional public land mobile network (PLMN), etc.

In the system 100 shown in FIG. 1, the first network device 130 being a main network device and the second network device 120 being a secondary network device are taken as an example.

The first network device 130 may be an LTE network device, and the second network device 120 may be an NR network device. Or, the first network device 130 may be an NR network device, and the second network device 120 may be an LTE network device. Or, both the first network device 130 and the second network device 120 may be an NR network device. Or, the first network device 130 may be a GSM network device, a CDMA network device, etc., and the second network device 120 may also be a GSM network device, a CDMA network device, etc. Or, the first network device 130 may be a Macrocell, and the second network device 120 may be a Microcell, Picocell, Femtocell, or the like.

According to some implementations, the terminal device 110 may be any terminal device, and the terminal device 110 includes but is not limited to:

an apparatus that is configured to receive or send communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal may refer to access terminals, user equipment (UE), user units, user stations, mobile stations, mobile platforms, remote stations, remote terminals, mobile device, user terminals, terminals, wireless communication device, user agents or user apparatuses. The access terminal may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, in-vehicle devices, wearable devices, terminals in 5G networks, or terminals in the future enhanced PLMN, etc.

It should be understood that the terms "system" and "network" in the present disclosure are often used interchangeably in the present disclosure.

It should be understood that in the embodiments of the present disclosure, an NR can be deployed independently. In the 5G network environment, in order to reduce air interface signaling, quickly restore wireless connections, and quickly restore data services, a new radio resource control (RRC) state, namely RRC_INACTIVE (inactive) state is made. This state is different from an RRC_IDLE (idle) state and an RRC_CONNECTED (connected) state.

In the RRC_IDLE state, mobility is a UE-based cell selection and reselection, a paging is initiated by a Core Network (CN), and a paging area is configured by the CN. There is no UE Access Stratum (AS) context on a base station side, and there is no RRC connection.

In the RRC_CONNECTED state, there is an RRC connection, and there is a UE AS context on the base station and the UE. The network device knows that the location of the UE is at a specific cell level. Mobility is the mobility controlled by the network device. Unicast data can be transmitted between the UE and the base station.

In the RRC_INACTIVE state, mobility is UE-based cell selection and reselection, there is a connection between CN-NR, UE AS context is stored on a certain base station, a paging is triggered by the Radio Access Network (RAN), a paging area based on RAN is managed by the RAN, and the network device knows that the location of the UE is at a level of the paging area based on the RAN.

The network device can control the state transition of the UE.

Figure 2:
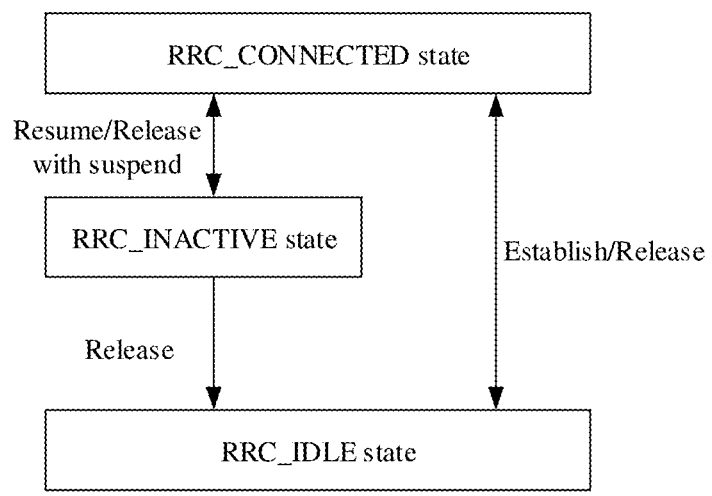
FIG. 2 is a schematic diagram of state switching of RRC in an NR provided by an embodiment of the present disclosure.

For example, as shown in FIG. 2, the UE in the RRC_CONNECTED state can enter the RRC_IDLE state by releasing an RRC connection; the UE in the RRC_IDLE state can enter the RRC_CONNECTED state by establishing an RRC connection; the UE in the RRC_CONNECTED state can enter the RRC_INACTIVE state by suspending the release of an RRC connection; the UE in the RRC_INACTIVE state can enter the RRC_CONNECTED state by resuming an RRC connection, or the UE in the RRC_INACTIVE state can enter the RRC_IDLE state by releasing an RRC connection.

It should be noted that the UE is in the RRC_INACTIVE state, and the UE autonomously returns to the idle state in the following situations:

when an initial paging message of CN is received; when an RRC resume request is initiated, timer T319 is started and when the timer expires; when the verification of integrity protection of the contention-based random access Message4 (MSG4) fails; when a cell using another Radio Access Technology (RAT) is reselected; or when a state of camping on any cell is entered.

In the embodiments of the present disclosure, the characteristics of the RRC_INACTIVE state may include the following.

The connection between the RAN and the CN is maintained; the UE and at least one gNB save the AS context; the UE is accessible for the RAN side, and the relevant parameters are configured by the RAN; when the UE moves within the RAN notification area (RNA) configured by the RAN, a network side (core network device) does not need to be notified, but when the UE moves out of the RNA, the network side (core network device) needs to be notified; UE moves within RNA according to a cell selection and reselection manner.

Figure 3:
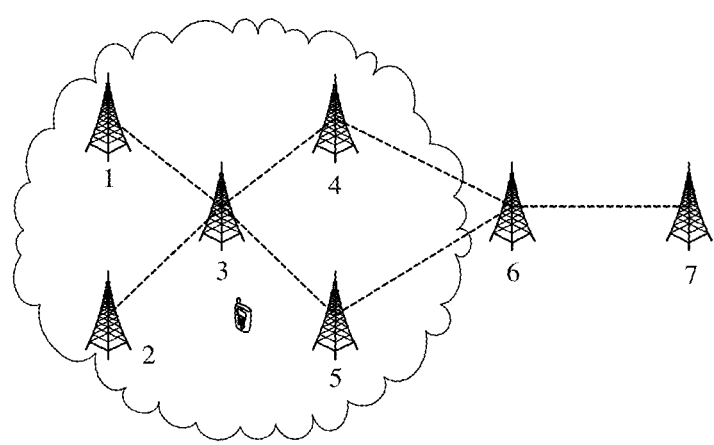
FIG. 3 is a schematic diagram of an RNA provided by an embodiment of the present disclosure.

It should be noted that the RNA can be specifically shown in FIG. 3. In the RNA shown in FIG. 3, when a UE moves between base station 1 to base station 5, the network side does not need to be notified, but when the UE moves to base station 6 or base station 7, the network side needs to be notified.

When a UE is in the RRC_INACTIVE state, the network device will configure the UE with configuration parameters of the RRC_INACTIVE through RRC Release dedicated signaling. For example, the network device will configure the UE with RNA. The RNA is used to control the area where the UE performs cell selection and reselection in the inactive state and which is also an initial paging area of the RAN.

When the UE moves within the RNA area, the network side does not need to be notified and the UE follows the mobility behavior in the idle state, that is, the principle of cell selection and reselection. When the UE moves out of the paging area configured by the RAN, the UE will be triggered to resume the RRC connection and re obtain the paging area configured by the RAN. When downlink data arrives at the UE, the gNB that keeps the connection between the RAN and the CN for the UE will trigger all cells in the RAN paging area to send paging messages to the UE, so that the UE in the INACTIVE state can restore the RRC connection and receive data. The UE in the INACTIVE state is configured with an RAN paging area. In this area, in order to ensure the reachability of the UE, the UE needs to perform periodic location update according to the period configured by the network.

Therefore, scenarios that the UE is triggered to perform RNA update include the RAN Notification Area Update (RNAU) timer expires or the UE moves to an area outside the RNA.

When the target base station where the UE initiates the RRC connection resume process is not an anchor base station, the anchor base station decides whether to transfer the context of the UE to the target base station side. Therefore, in general, the target base station sends the cause value carried in an RRC connection resume request initiated by the UE to the anchor base station during the UE context retrieval process, and the anchor base station decides whether to transfer the UE context to the target base station side. For example, periodic RAN location update generally does not require performing the context transfer.

Figure 4:
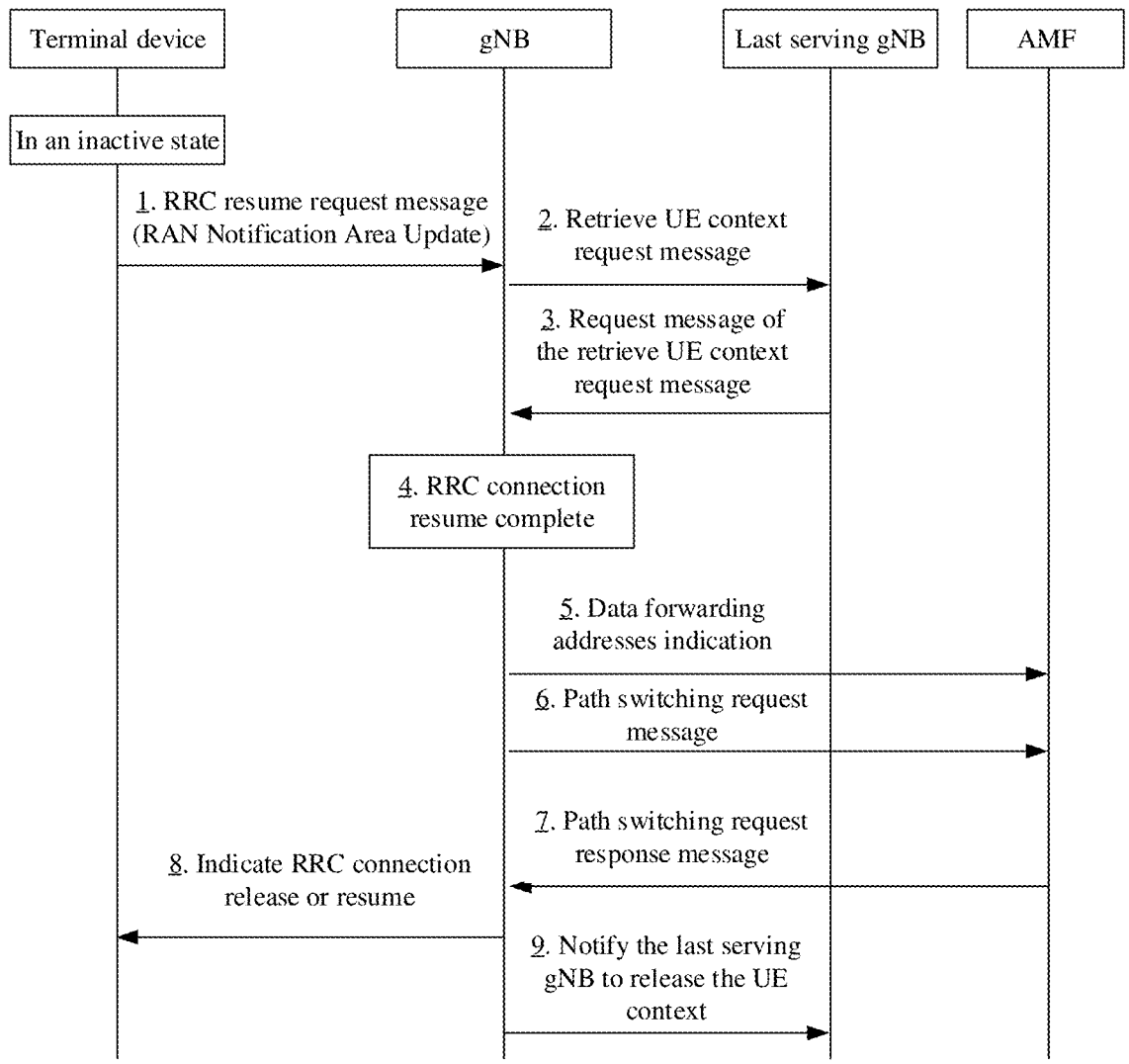
FIG. 4 is a schematic flow chart of RNAU with context migration according to an embodiment of the present disclosure.

FIG. 4 is a schematic flow chart of RNAU with context migration according to an embodiment of the present disclosure.

As shown in FIG. 4, the method includes the following operations.

In operation 1, the UE resumes from RRC_INACTIVE and provides an I-RNTI allocated by the last serving gNB (i.e., an anchor base station).

In operation 2, if the gNB identity contained in the I-RNTI can be parsed, the gNB requests the last serving gNB to provide UE context data.

In operation 3, the last serving gNB provides UE context data.

In operation 4, the gNB completes the RRC connection resume.

In operation 5, to prevent the loss of the downlink user data buffered in the last serving gNB, the gNB that the UE accesses provides downlink data forwarding addresses to the last serving gNB.

In operation 6, the gNB performs path switching (by sending a path switching request message to a serving AMF).

In operation 7, the AMF replies with a response message of the path switching. That is, the last serving gNB sends a response message of the path switching request message to the gNB.

In operation 8, the gNB notifies the last serving gNB to release the UE context.

When the gNB decides to reject the resume request (and in the absence of any reconfiguration) to keep the UE in RRC_INACTIVE, or when the gNB decides to establish a new RRC connection, SRB0 can be used; when the gNB decides to reconfigure the UE (for example, using a new DRX period or RNA) or when gNB decides to switch UE to RRC_IDLE, SRB1 can be used.

Figure 5:
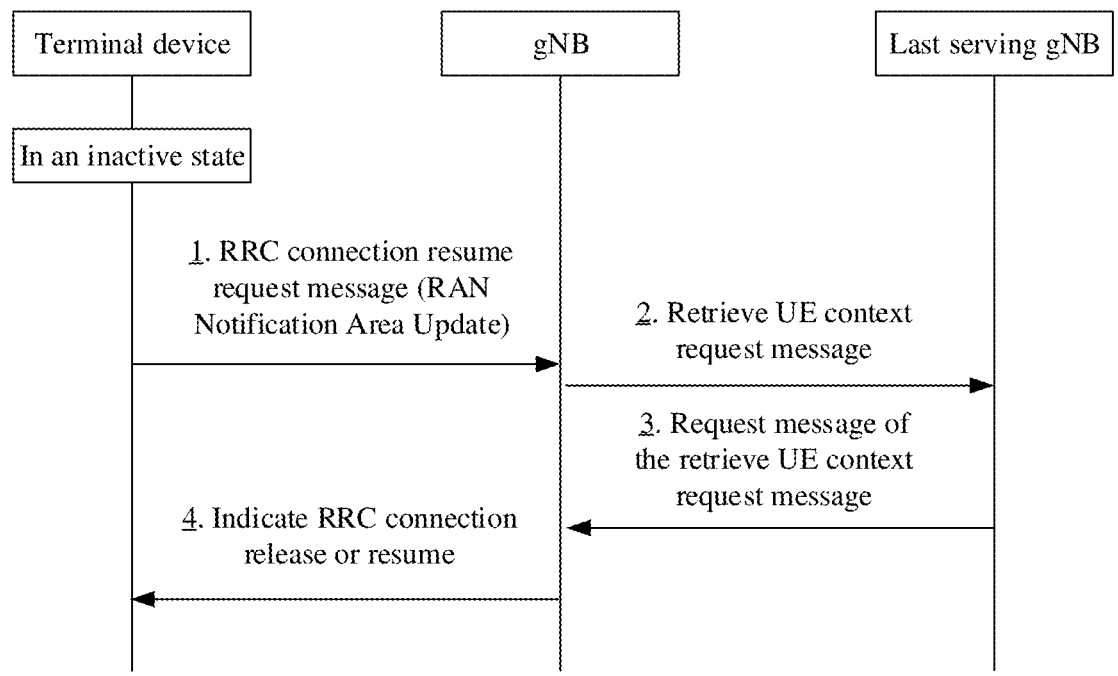
FIG. 5 is a schematic flow chart of RNAU without context migration according to an embodiment of the present disclosure.

FIG. 5 is a schematic flow chart of RNAU without context migration according to an embodiment of the present disclosure.

As shown in FIG. 5, the method includes the following operations.

In operation 1, the UE resumes from RRC_INACTIVE and provides the I-RNTI allocated by the last serving gNB and an appropriate cause value, such as an RAN notification area update.

In operation 2, if the gNB identity contained in the I-RNTI can be parsed, the gNB requests the last serving gNB to provide UE context.

In operation 3, the last serving gNB provides the UE context.

In operation 4, the gNB can switch the state of the UE to the RRC_CONNECTED state, or switch the state of the UE back to the RRC_INACTIVE state or switch the state of the UE to the RRC_IDLE state.

Therefore, the UE entering the RRC connected state from the INACTIVE state may include the following three situations.

In a first situation, downlink data arrives at the UE, and the network side initiates the initial paging of the RAN to prompt the UE to enter the connected state.

In a second situation, the UE itself initiates an RAN location area update, such as a periodic RAN location update or a cross-area location update.

In a third situation, the UE has a demand of transmitting uplink data which prompts the UE to enter the connected state.

For the UE in the RRC_INACTIVE state, the initial paging of CN and the initial paging of an RAN are received at the same time.

The UE in the RRC_INACTIVE state keeps the connection between the RAN and the CN. When downlink data arrives, the RAN is triggered to initiate an initial paging of the RAN to notify the UE to resume the RRC connection in order to receive the downlink data. The initial paging message of the RAN is identical to the initial paging message of the CN, but the DRX adopted in calculating the paging time is different. The initial paging of the RAN selects a DRX by adopting a principle of taking the smallest DRX among Cell default DRX, UE specific DRX and RAN DRX for calculating PF/PO. The paged UE is identified with an I-RNTI. In order to ensure the correct reception of the paging message and prevent missing any paging message, an integral multiple relationship is configured among Cell default DRX, UE specific DRX, and RAN DRX.

The initial paging message of CN selects a DRX by adopting a principle of taking the smallest DRX between Cell default DRX and UE specific DRX for calculating PF/PO. The paged UE is identified with an S-TMSI. The UE in the idle state and the connected state only receives the initial paging of the CN. The UE in the RRC_INACTIVE state receives the initial paging of the RAN and the initial paging of the CN. The initial paging message of the CN is sent to the UE in the RRC_INACTIVE state only when an abnormality occurs on the network side, for example, the RAN cannot find the UE context. When the UE receives the initial paging message of the CN and considers that an abnormality exists, the UE will return to the idle state and notify the NAS to perform resuming.

Figure 6:
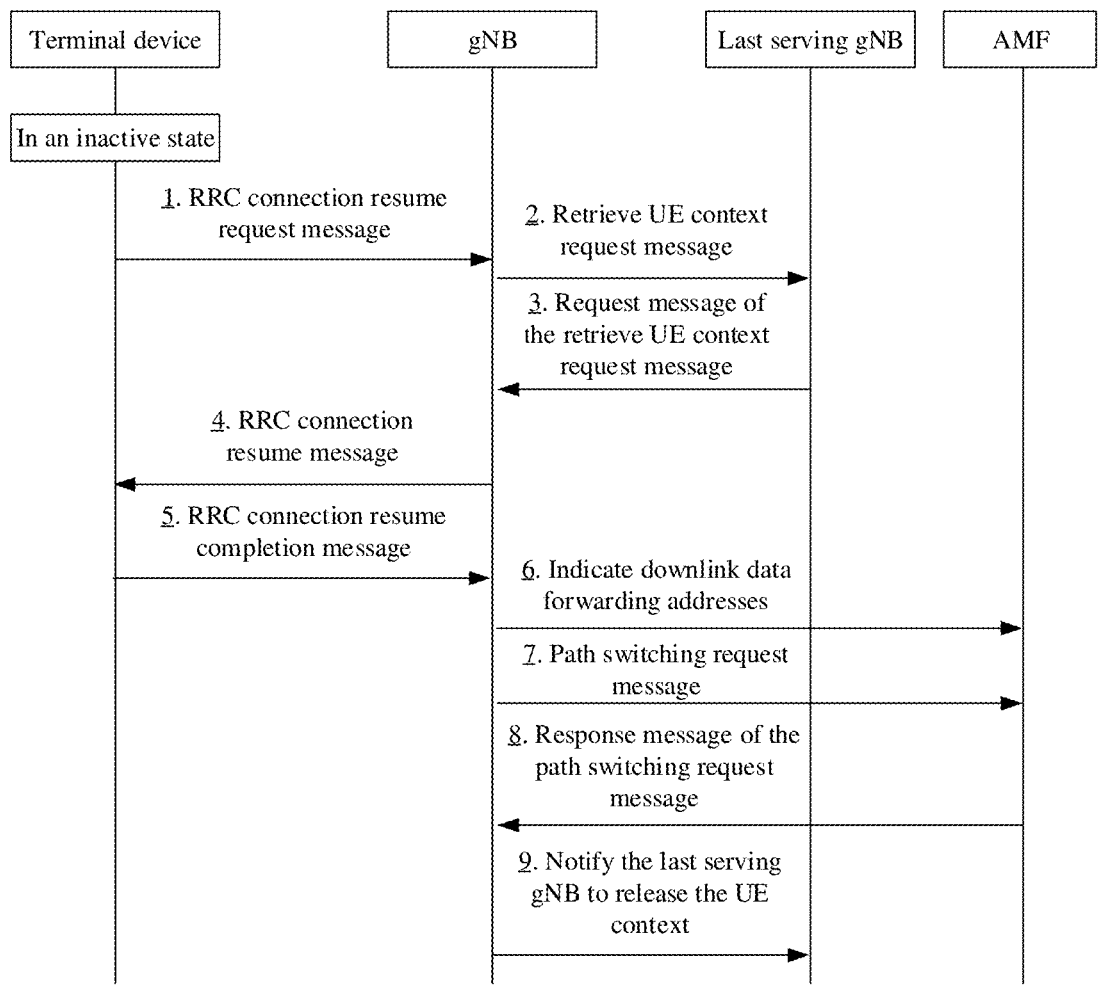
FIG. 6 is a schematic flowchart of a terminal device in an inactive state entering a connected state according to an embodiment of the present disclosure.

FIG. 6 is a schematic flow chart of the UE entering a connected state from an inactive state according to an embodiment of the present disclosure.

As shown in FIG. 6, the method includes the following operations.

In operation 1, the UE resumes from RRC_INACTIVE and provides the I-RNTI allocated by the last serving gNB and an appropriate cause value, such as an RAN notification area update.

In operation 2, if the gNB identity contained in the I-RNTI can be parsed, the gNB requests the last serving gNB to provide the UE context.

In operation 3, the last serving gNB provides the UE context.

In operation 4, the gNB sends an RRC connection resume message to a terminal device.

In operation 5, the terminal device sends an RRC connection resume completion message to the gNB.

In operation 6, if it is required to prevent the loss of the downlink user data buffered in the last serving gNB, the gNB that the UE accesses provides downstream data forwarding addresses to the last serving gNB.

In operation 7, the gNB performs path switching (by sending a path switching request message to the serving AMF).

In operation 8, the AMF replies with a path switching response message.

In operation 9, the last serving gNB is notified to release the UE context.

Further, the safety requirements for the RRC connection resume process are as follows.

The RRC release message carries NCC for encryption and integrity protection of the MSG4; the initial RRC message (MSG3) for transitions from RRC_INACTIVE is transmitted on SRB0, and MAC-I is generated based on an old secret key for identity verification; encryption and integrity protection are needed for the MSG4 (SRB1) carrying RRC_INACTIVE configuration information; the secret key used is a secret key generated based on NCC or a secret key horizontally derived based on the old secret key. The RRC Reject message is transmitted on the SRB0.

In order to meet the demand for high rates, the 5G also supports Carrier Aggregation (CA) technology which allows the NR system to support a larger bandwidth through jointly scheduling and using resources on multiple component carriers (CC), thereby achieving a higher system peak rate.

Figure 7:
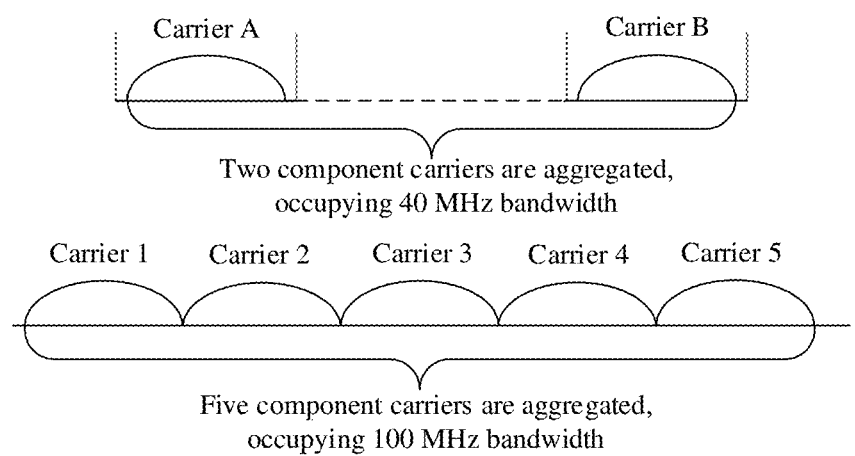
FIG. 7 is a schematic diagram of carrier aggregation provided by an embodiment of the present disclosure.

As shown in FIG. 7, non-continuous carrier aggregation can be realized. The two component carriers are carrier A and carrier B, and carrier A and carrier B are discontinuous carriers. Each of carrier A and carrier B occupies 20 MHz bandwidth, occupying 40 MHz bandwidth in total. According to some implementations, continuous carrier aggregation can also be realized. The five component carriers are carrier 1 to carrier 5, and carrier 1 to carrier 5 are continuous carriers. Each carrier occupies 20 MHz bandwidth, occupying 100 MHz bandwidth in total.

In NR CA, there is only one primary component carrier (PCC), and the PCC provides RRC signaling connection, non-access stratum (NAS) functions and security, etc. The Physical Uplink Control Channel (PUCCH) exists on the PCC and only exists on the PCC. The secondary component carrier (SCC) only provides additional radio resources. The PCC and the SCC are both referred to as serving cells. The standard also stipulates that the maximum number of the aggregated carriers supported is 5, that is, the maximum bandwidth after aggregation is 100 MHz, and the aggregated carriers belong to one base station. All aggregated carriers use a same Cell Radio Network Temporary Identity (C-RNTI), and the base station ensures that the C-RNTI does not conflict in the cell where each carrier is located. Since two types of carrier aggregation, namely asymmetric carrier aggregation and symmetric carrier aggregation, are supported, it is required that the aggregated carriers must have downlink but may not have uplink. Moreover, for the primary cell, there must be a physical downlink control channel (PDCCH) and PUCCH of the cell, and only the primary cell has a PUCCH, and other secondary cells may have a PDCCH.

The Secondary Cell (SCell) is configured through RRC dedicated signaling, and the state of initial configuration is the inactive state during which data transmission and reception cannot be performed. Then the data transmission and reception can only be performed after the SCell is activated through the MAC CE. From the perspective of the time delay of SCell configuration and activation, this architecture is not an optimal architecture. This time delay reduces the efficiency of CA usage and radio resources, especially in scenarios of small cell deployment. In a scenario of dense small cell deployment, the signaling load of each SCell is also large, especially when each SCell needs to be configured separately. Therefore, the current CA architecture introduces additional delay which restricts CA usage and reduces the gain of CA load sharing.

It should be understood that the embodiments of the present disclosure may be applied to a dual connectivity (DC) scenario, or also referred to as MR-DC scenario.

It should be noted that MR-DC can include LTE NR DC (EN-DC), NR eLTE DC (NE-DC), 5GC eLTE NR DC (5GC-EN-DC), NR DC. In EN-DC, an LTE node serves as an MN node and an NR node serves as an SN node to connect to the EPC core network. In NE-DC, an NR serves as an MN node and an eLTE serves as an SN node to connect to 5GC. In 5GC-EN-DC, an eLTE serves as an MN node, and an NR serves as an SN node to connect to the 5GC. In NR DC, an NR serves as an MN node, and an NR serves as an SN node to connect to the 5GC.

Figure 8:
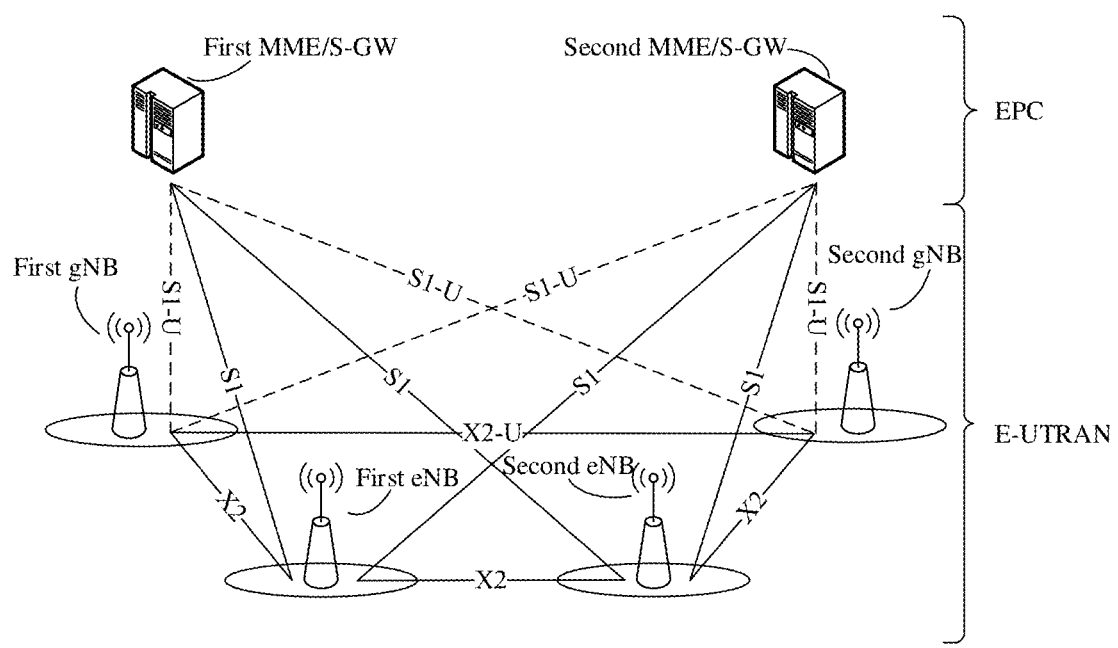
FIG. 8 is a schematic diagram of an EN-DC network architecture provided by an embodiment of the present disclosure.

For example, the network architecture of EN-DC is shown in FIG. 8. The eNB serves as the MN node, the gNB serves as the SN node, the eNB is connected to a mobility management entity (MME) or a serving gateway (S-GW) through the S1 interface, the gNB is connected to the MME or the S-GW through S1-U interface (an S1 interface at the user side). The two eNBs are connected through an X2 interface, and two gNBs are connected through an X2-U interface (an X2 interface at the user side), the eNB and gNB are connected through the X2 interface. The eNB mainly implements the RRC control function and the control plane function leading to the CN. The gNB can be configured with secondary signaling, such as Signaling Radio Bearers 3 (SRB 3), which mainly provides data transmission functions.

Regardless of the CA configuration or the MR-DC configuration, it is necessary to reduce the time delay of the configuration and activation of the SCell and the configuration and activation of the SCG to meet the cell capacity improvement especially in the scenario of small cell deployment.

As shown in FIG. 8, the network architecture takes LTE-NR Dual Connectivity (EN-DC) as an example. Herein, LTE serves as a master node (MN), and NR serves as a secondary node (SN). In other alternative embodiments, the MN is also referred to as MeNB, and the SN is also referred to as SeNB.

In the embodiment of the present disclosure, the NR network architecture is added to the LTE architecture to form network architecture.

As shown in FIG. 8, the network architecture may include a first MME/S-GW, a second MME/S-GW, a first gNB, a second gNB, a first eNB and a second eNB. Herein, the first MME/S-GW is connected to the first gNB and the second gNB through the S1-U interface, and the first MME/S-GW is connected to the first eNB and the second eNB through the S1 interface. The second MME/S-GW is connected to the first gNB and the second gNB through the S1-U interface, and the second MME/S-GW is connected to the first eNB and the second eNB through the S1 interface. The first gNB and the second gNB are connected through the X2-U. The first eNB and the second eNB are connected through the X2. Similarly, the first eNB and the first gNB are connected through the X2. The second gNB and the second eNB are connected through the X2. In other words, the eNB and the eNB are directly interconnected through the X2 interface, and the eNB is connected to the EPC through the S1 interface. The S1 interface supports multiple-to-multiple connections between MME/S-GW and eNB, that is, one eNB can be connected to multiple MME/S-GWs, and multiple eNBs can be connected to the one MME/S-GW at the same time. Similarly, the gNBs are directly interconnected through the X2-U interface, and gNB is connected to EPC through an S1-U interface. The S1-U interface supports multiple-to-multiple connections between the MME/S-GW and the gNB, that is, one gNB can be connected to multiple MME/S-GWs, and multiple gNBs can be connected to one MME/S-GW at the same time.

As shown in FIG. 8, in the embodiment of the present disclosure, the first MME/S-GW and the second MME/S-GW belong to the Evolved Packet Core (EPC) of the LTE network, and the first gNB, the second gNB, and the first eNB and the second eNB constitute an Evolved Universal Terrestrial Radio Access Network (E-UTRAN). However, the embodiments of the present disclosure are not limited thereto. For example, the first MME/S-GW and the second MME/S-GW can be replaced by any core network device that communicates with the access network device.

According to some implementations, the core network device may be a 5G core network device, for example, an Access and Mobility Management Function (AMF), or for another example, a Session Management Function (SMF). According to some implementations, the core network device may also be an Evolved Packet Core (EPC) equipment of the LTE network, for example, a session management function plus a core packet gateway (SMF+PGW-C) equipment.

It should be understood that SMF+PGW-C can simultaneously implement the functions that the SMF and the PGW-C can implement.

According to some implementations, in the embodiment of the present disclosure, the AMF may exchange information with the SMF. For example, the SMF obtains some information of radio access network side from the AMF.

It should be noted that the network architecture shown in FIG. 8 is only an exemplary description of the dual-connection network architecture, and the embodiment of the present disclosure is not limited thereto. For example, in other alternative embodiments, the network architecture can also be simply modified. For example, as an example, the first gNB and/or the second gNB may not be directly connected to the EPC (i.e., the first MME/S-GW and the second MME/S-GW). It should also be understood that the EN-DC shown in FIG. 2 is only an example of dual-connection network architecture, and the DC mode in the embodiment of the present disclosure includes but is not limited to, including EN-DC, NE-DC, 5GC-EN-DC and NR DC. In EN-DC, the LTE node serves as the MN node, and the NR node serves as the SN node to connect to the EPC core network. In NE-DC, NR serves as an MN node, and eLTE serves as an SN node to connect to the 5GC core network. In 5GC-EN-DC, eLTE serves as the MN node and NR serves as the SN node to connect to the 5GC core network. In NR DC, NR serves as the MN node, and NR serves as the SN node to connect to the 5GC core network.

However, in the long term evolution (LTE), measurement configuration information used to assist a network device in performing CA and Multi-RAT Dual Connectivity (MR-DC) configuration does not support inactive state, but the inactive state exists in the NR.

At present, when the terminal device enters an idle state or a connected state from the inactive state, how the terminal device processes the measurement configuration information used when the terminal device is in an inactive state, and an occasion for the terminal device to stop measurement are not specified in the related art. Furthermore, after the state transition, how the UE obtains the measurement configuration after releasing original configuration also needs to be clarified.

An embodiment of the present disclosure provides a method for wireless communication. By adopting this method, when the terminal device enters a second state from a first state, second measurement configuration information used by a terminal device in the second state can be effectively maintained or obtained, thus the validity of the measurement configuration can be ensured, and then the optimal measurement result can be provided for the network device, which can effectively shorten the time delay of CA and MR-DC configuration, and improve the system capacity and the data transmission rate of the terminal device.

Figure 9:
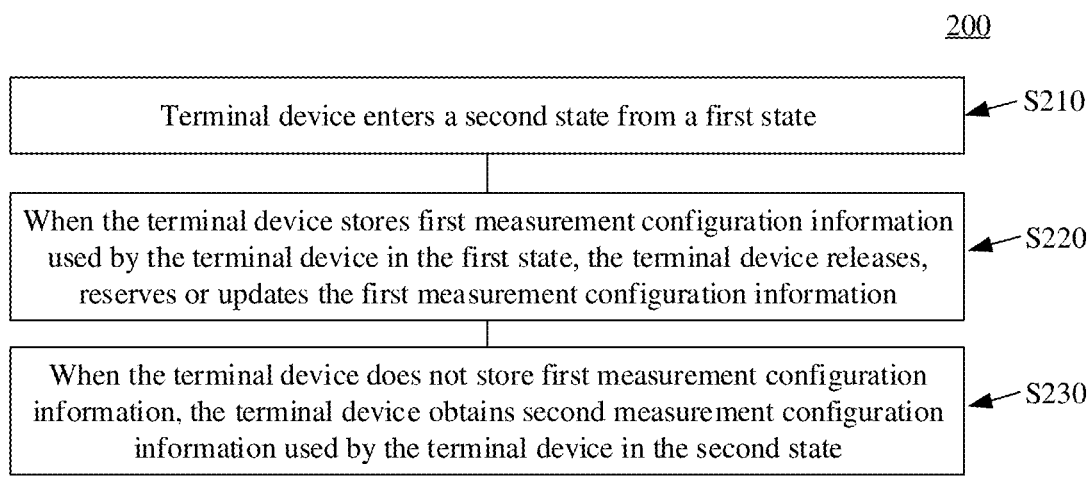
FIG. 9 is a schematic flowchart of a method for wireless communication according to an embodiment of the present disclosure.

FIG. 9 shows a schematic flowchart of a method 200 for wireless communication according to an embodiment of the present disclosure, and the method 200 may be implemented by a terminal device. The terminal device shown in FIG. 9 may be the terminal device shown in FIG. 1, and the network device shown in FIG. 9 may be the access network device shown in FIG. 1. The method 200 includes some or all of the following contents.

As shown in FIG. 9, the method 200 includes the following operations.

In S210, a terminal device enters a second state from a first state.

In S220, when the terminal device stores first measurement configuration information used by the terminal device in the first state, the terminal device releases, reserves or updates the first measurement configuration information.

According to some implementations, in S230, when the terminal device does not store first measurement configuration information, the terminal device obtains second measurement configuration information used by the terminal device in the second state.

Herein, the first state is an idle state or an inactive state, the second state is any one of an idle state, an inactive state or a connected state, and the measurement configuration information is used by the terminal device to obtain a measurement result.

In the embodiment of the present disclosure, the measurement configuration information may include at least one of:

measurement frequency (carrierFreq), measurement bandwidth (allowedMeasBandwidth), valid area range (validityArea), reported cell list (measCellList), reported measurement quantity of the measurement (reportQuantities) and reported threshold of the measurement (qualityThreshold).

According to some implementations, the reported measurement quantity is specified by reportQuantities. The reported measurement quantity of the measurement is specific to one of Reference Signal Receiving Power (RSRP), Reference Signal Receiving Quality (RSRQ) and Signal to Interference plus Noise Ratio (SINR).

The carrierFreq and allowedMeasBandwidth indicate the frequency and bandwidth of the measurement; the validityArea configures the valid range of the idle measurement configuration, which is a cell list. If the UE reselects a cell beyond the validityArea, the timer T331 is stopped. The measCellList provides the cells of which the measurement configuration is reported, and measurement configuration of other cells does not need to be reported. If the measCellList is not configured, the UE can report measurements of up to a specific number of cells that meet the qualityThreshold.

According to some implementations, the valid area range of the measurement configuration is one of a cell list, a tracking area (TA) list, an RAN area list, a system information area list and a valid area identifier (ID) list.

It should be noted that the above-mentioned cell list, the TA list, the RAN area list, the system information area list and the valid area ID list do not necessarily appear in the form of a list, but may also appear in some other forms, which is not limited in the present disclosure.

According to some implementations, the measurement result is used by the network device to perform at least one of carrier aggregation (CA) configuration or dual connectivity (DC) configuration.

That is to say, the measurement result can be used to assist the network device to quickly configure the secondary cell and/or secondary cell group in the CA, and/or to assist the network device to quickly configure the Multi-RAT Dual Connectivity. In this way, the rapid activation or deactivation of the secondary cell and/or secondary cell group can be implemented and the time delay of the activation or deactivation of the secondary cell and/or secondary cell group can be reduced to meet the improvement of the cell capacity especially in the scenario of small cell deployment.

In addition, after the terminal device enters the second state from the first state, by judging whether the first measurement configuration information is stored, second measurement configuration information used by the terminal device in the second state can be effectively maintained or obtained, thus the validity of the measurement configuration can be ensured, and then the optimal measurement result can be provided for the network device, which can effectively shorten the time delay of CA and MR-DC configuration, and improve the system capacity and the data transmission rate of the terminal device.

It should be understood that, in the embodiment of the present disclosure, the first state and the second state may be a radio resource control (RRC) state between the terminal device and the network device. The RRC state may include a connected state, an idle state and an inactive state. The implementation of the embodiments of the present disclosure will be described in detail below in conjunction with specific scenarios.

Based on the above technical solutions, the terminal device in the idle state or in the inactive state can perform cell measurement based on the configuration of the network device, and after entering the connected state, report the measurement result to assist the network device in configuring the secondary cell and/or secondary cell group in CA, and/or, assist in configuring Multi-RAT Dual Connectivity (MR-DC), so as to realize the rapid activation or deactivation of the secondary cell and/or the secondary cell group. Further, after the terminal device enters the second state from the first state, by judging whether the first measurement configuration information is stored, second measurement configuration information used by the terminal device in the second state can be effectively maintained or obtained, thus the validity of the measurement configuration can be ensured, and then the optimal measurement result can be provided for the network device, which can effectively shorten the time delay of CA and MR-DC configuration, and improve the system capacity and the data transmission rate of the terminal device.

First Embodiment

The first state is an inactive state, and the second state is an inactive state or an idle state.

Specifically, a network device may control a terminal device in an inactive state to enter an active state or an idle state. The terminal device sends an RRC connection resume request message to a network device; the terminal device receives a response message in response to an RRC connection resume request message and sent by the network device; the terminal device enters an inactivate state or an idle state according to the response message.

According to some implementations, when the terminal device stores the first measurement configuration information, the terminal device may process the first measurement configuration information. For example, the terminal device releases, reserves or updates the first measurement configuration information.

For example, when a certain condition is met, the terminal device releases the first measurement configuration information, otherwise the terminal device reserves or updates the first measurement configuration information. Specifically, when the response message includes first indication information, the terminal device releases the first measurement configuration information, herein the first indication information is used to instruct the terminal device to release the first measurement configuration information; and/or, when the response message does not include the first indication information, the terminal device reserves or updates the first measurement configuration information. In other words, when the network device controls the terminal device to enter a second state from a first state, the network device generates and sends first indication information. Further, when the terminal device updates the first measurement configuration information, the measurement configuration information in the system broadcast message may be adopted to update the first measurement configuration information.

For another example, when a certain condition is met, the terminal device may update the first measurement configuration information, otherwise the terminal device may release or reserve the first measurement configuration information. Specifically, when the response message includes the second measurement configuration information, the terminal device utilizes the second measurement configuration information to update the first measurement configuration information; and/or, when the response message does not include the second measurement configuration information, the terminal device releases or reserves the first measurement configuration information.

For another example, when a certain condition is met, the terminal device reserves the first measurement configuration information, otherwise the terminal device releases or updates the first measurement configuration information. When the first measurement configuration information belongs to a dedicated RRC signaling, the terminal device reserves the first measurement configuration information; and/or when the first measurement configuration information belongs to a system broadcast message, the terminal device releases or updates the first measurement configuration information. More specifically, when the first measurement configuration information belongs to a dedicated RRC signaling, the terminal device may reserve the first measurement configuration information, and until the timer of the first measurement configuration information stops or expires or after the timer of the first measurement configuration information stops or expires, the terminal device releases or updates the first measurement configuration information.

For another example, when a certain condition is met, the terminal device updates the first measurement configuration information, otherwise the terminal device releases or reserves the first measurement configuration information. Specifically, the terminal device receives a system broadcast message, and when the system broadcast message includes third measurement configuration information, the terminal device utilizes the third measurement configuration information to update the first measurement configuration information; and/or, when the system broadcast message does not include the third measurement configuration information, the terminal device reserves or releases the first measurement configuration information.

After the terminal device enters the inactive state or the idle state, when the terminal device reserves the first measurement configuration information, the terminal device performs the measurement according to the first measurement configuration information, and records the measurement result; when the terminal device updates the first measurement configuration information, the terminal device performs the measurement according to the updated first measurement configuration information, and records the measurement result; and when the terminal device releases the first measurement configuration information, the measurement is stopped.

According to some implementations, when the terminal device does not store the first measurement configuration information, the terminal device may obtain the second measurement configuration information used by the terminal device is in the second state.

For example, the terminal device receives a system broadcast message; when the system broadcast message includes third measurement configuration information, the terminal device determines the third configuration information as the second configuration information. Further, the terminal device receives second indication information sent by the network device, herein the second indication information is used to instruct the terminal device to obtain the second measurement configuration information from the system broadcast message. In other words, when the network device controls the terminal device to enter a second state from a first state, the network device generates and sends second indication information.

It should be understood that, in other alternative embodiments, when the terminal device does not store the first measurement configuration information, the terminal device may stop the measurement, that is, the terminal device does not obtain measurement configuration information from the system broadcast message. The terminal device may determine, based on the implementation of the terminal device, whether to obtain the measurement configuration information from the system broadcast message, and if so, the terminal device may perform measurement according to the measurement configuration information, and record the measurement result.

In the embodiment of the present disclosure, a system broadcast or an RRC dedicated signaling, for example, an RRC connection release message can configure the measurement configuration of the UE in the idle state and/or the inactive state. The measurement configuration includes a list of measurement configuration information for E-UTRAN frequencies and a list of measurement information for NR frequencies. The measurement configuration requires the UE to perform measurement in the idle and/or inactive state, and report the measurement to the network side when UE enters the connected state, and assist the network side to configure the CA or the MR-DC.

Hereinafter, the embodiment of the present disclosure will be described by taking the first state being the inactive state and the second state being the inactive state as an example.

When UE transitions from the inactive state to other RRC states, the UE can effectively process the dedicated measurement configuration information and the measurement configuration information configured by the system broadcast in the inactive state. For example, when the UE is in the RRC_INACTIVE state, the UE initiates an RRC connection resume request message to the network side. The UE receives the response message from the network side, if the response message is an RRC connection release message, and the message instructs the UE to enter the RRC_INACTIVE state, further description is as follows.

It is assumed that the UE stores the dedicated measurement configuration information or the measurement configuration information configured by the system broadcast.

According to some implementations, if the network side indicates new measurement configuration information in an RRCRelease message, the UE releases the original measurement configuration information and saves the new measurement configuration information.

According to some implementations, if the network side does not indicate new measurement configuration information in the RRCRelease message, the UE releases the original measurement configuration information.

According to some implementations, if the network side does not indicate new measurement configuration information in the RRCRelease message, the UE keeps the original measurement configuration information.

According to some implementations, if the network side does not indicate new measurement configuration information in the RRCRelease message, the network side adds an indication to the RRCRelease message to explicitly instruct the UE to release the stored measurement configuration information.

According to some implementations, if the network side does not indicate new measurement configuration information in the RRCRelease message, then when the current cell broadcasts the measurement configuration, the original old configuration is released, otherwise the original old measurement configuration is kept.

According to some implementations, if the network side does not indicate new measurement configuration information in the RRCRelease message, and the originally stored measurement configuration is the measurement configuration obtained from the system broadcast, then when the current cell broadcasts the measurement configuration, the original old configuration is released, otherwise the original old measurement configuration is kept.

After the UE enters the RRC_INACTIVE state, if the UE stores measurement configuration information, the UE performs measurement according to the measurement configuration information, and records the measurement result It is assumed that the measurement configuration information is not stored in the UE, and the measurement configuration information exists in the system broadcast.

According to some implementations, when the UE obtains the measurement configuration information from the system broadcast, the UE performs measurement according to the measurement configuration information, and records the measurement result.

According to some implementations, the UE does not obtain the measurement configuration information from the system broadcast.

According to some implementations, based on the implementation of the UE, the UE determines whether to obtain the measurement configuration information from the system broadcast, and if the UE determines to obtain the measurement configuration information from the system broadcast, the UE performs the measurement according to the measurement configuration information and records the measurement result.

According to some implementations, the network side instructs the UE about whether to obtain the measurement configuration information from the system broadcast, and if the network side instructs the UE to obtain the measurement configuration information from the system broadcast, the UE obtains the measurement configuration information from the system broadcast, performs the measurement according to the measurement configuration information, and records the measurement result.

Hereinafter, the embodiment of the present disclosure will be described below by taking the first state being the inactive state and the second state being the idle state as an example.

The UE is in the RRC_INACTIVE state, and the UE initiates an RRC connection resume request message RRCResumeRequest to the network side.

The UE receives the response message from the network side. If the response message is an RRCRelease message, and the message instructs the UE to enter the RRC_IDLE state, and if the UE stores the dedicated measurement configuration information or the measurement configuration information configured by the system broadcast, further description is as follows.

According to some implementations, if the network side indicates new measurement configuration information in the RRCRelease message, the UE releases the original measurement configuration information and saves the new measurement configuration information.

According to some implementations, if the network side does not indicate new measurement configuration information in the RRCRelease message, the UE releases the original measurement configuration information.

According to some implementations, if the network side does not indicate new measurement configuration information in the RRCRelease message, the UE keeps the original measurement configuration information.

According to some implementations, if the network side does not indicate new measurement configuration information in the RRCRelease message, the network side adds an indication to the RRCRelease message to explicitly instruct the UE to release the stored measurement configuration information.

According to some implementations, if the network side does not indicate new measurement configuration information in the RRCRelease message, then when the current cell broadcasts the measurement configuration, the original old configuration is released, otherwise the original old measurement configuration is kept.

According to some implementations, if the network side does not indicate new measurement configuration information in the RRCRelease message, and the originally stored measurement configuration is the measurement configuration obtained from the system broadcast, then when the current cell broadcasts the measurement configuration, the original old configuration is released, otherwise the original old measurement configuration is kept.

After the UE enters the RRC_IDLE state, if the UE stores the measurement configuration information, the UE performs measurement according to the measurement configuration information, and records the measurement result. If the measurement configuration information is not stored in the UE and the measurement configuration information exists in the system broadcast, further description is as follows.

According to some implementations, if the UE obtains the measurement configuration information from the system broadcast, the UE performs measurement according to the measurement configuration information, and records the measurement result.

According to some implementations, the UE does not obtain the measurement configuration information from the system broadcast.

According to some implementations, based on the implementation of the UE, the UE determines whether to obtain the measurement configuration information from the system broadcast, and if the UE determines to obtain the measurement configuration information from the system broadcast, the UE performs the measurement according to the measurement configuration information and records the measurement result.

According to some implementations, the network side instructs the UE about whether to obtain the measurement configuration information from the system broadcast, and if the network side instructs the UE to obtain the measurement configuration information from the system broadcast, the UE obtains the measurement configuration information from the system broadcast, performs measurement according to the measurement configuration information, and records the measurement result.

Second Embodiment

The first state is an inactive state, and the second state is an idle state.

Specifically, the terminal device can autonomously enter the idle state from the inactive state.

For example, the terminal device in the inactive state can be triggered to enter the idle state by any of the following events: an initial paging message sent by a Core Network (CN) is received; a timer is started when an RRC connection resume request message is sent to the network device, and the timer expires; the verification of integrity protection of a message 4 (MSG4) fails; the cell using another Radio Access Technology (RAT) is reselected; and the terminal device enters a state of camping on any cell.

According to some implementations, when the terminal device stores the first measurement configuration information, the terminal device may process the first measurement configuration information. For example, the terminal device releases, reserves or updates the first measurement configuration information.

For example, when a certain condition is met, the terminal device reserves the first measurement configuration information, otherwise the terminal device releases or updates the first measurement configuration information. When the first measurement configuration information belongs to a dedicated RRC signaling, the terminal device reserves the first measurement configuration information; and/or when the first measurement configuration information belongs to a system broadcast message, the terminal device releases or updates the first measurement configuration information. More specifically, when the first measurement configuration information belongs to a dedicated RRC signaling, the terminal device may reserve the first measurement configuration information, and until the timer of the first measurement configuration information stops or expires or after the timer of the first measurement configuration information stops or expires, the terminal device releases or updates the first measurement configuration information.

For another example, when a certain condition is met, the terminal device updates the first measurement configuration information, otherwise the terminal device releases or reserves the first measurement configuration information. Specifically, the terminal device receives a system broadcast message, and when the system broadcast message includes third measurement configuration information, the terminal device utilizes the third measurement configuration information to update the first measurement configuration information; and/or, when the system broadcast message does not include the third measurement configuration information, the terminal device reserves or releases the first measurement configuration information.

After the terminal device enters the inactive state or the idle state, when the terminal device reserves the first measurement configuration information, the terminal device performs the measurement according to the first measurement configuration information and records the measurement result; when the terminal device updates the first measurement configuration information, the terminal device performs the measurement according to the updated first measurement configuration information and records the measurement result; and when the terminal device releases the first measurement configuration information, the measurement is stopped.

According to some implementations, when the terminal device does not store the first measurement configuration information, the terminal device may obtain the second measurement configuration information used by the terminal device is in the second state.

For example, the terminal device receives a system broadcast message; when the system broadcast message includes third measurement configuration information, the terminal device determines the third configuration information as the second configuration information. Further, the terminal device receives second indication information sent by the network device, herein the second indication information is used to instruct the terminal device to obtain the second measurement configuration information from a system broadcast message. In other words, when the network device controls the terminal device to enter a second state from a first state, the network device generates second indication information and sends the second indication information.

In other words, in the embodiment of the present disclosure, if the UE in the RRC_INACTIVE state enters the idle state due to certain events (see the introduction in the background section for specific events), and it is assumed that the UE stores the dedicated measurement configuration information, further description is as follows.

According to some implementations, the UE releases the original measurement configuration information.

According to some implementations, the UE keeps the original measurement configuration information until the measurement configuration timer stops or expires. In the idle state, the UE still performs measurement according to the configuration information.

If the UE is in the RRC_INACTIVE state and enters the idle state due to certain events (see the introduction in the background section for specific events), and it is assumed that the UE stores the measurement configuration information configured by the system broadcast, further description is as follows.

According to some implementations, the UE releases the original measurement configuration information.

According to some implementations, the UE keeps the original measurement configuration information, and the UE in the idle state still performs measurement according to the configuration information.

According to some implementations, if the measurement configuration information is not configured in the system broadcast of the current cell, the UE keeps the original measurement configuration information, and the UE in the idle state still performs measurement according to the configuration information.

According to some implementations, if the measurement configuration information is configured by the system broadcast of the current cell, the UE releases the measurement configuration information.

It is assumed that the UE releases the measurement configuration information after entering the idle state.

According to some implementations, if the measurement configuration information is broadcast in the system broadcast information of the current cell, the UE obtains the measurement configuration information from the system broadcast, and performs measurement according to the configuration information.

According to some implementations, if the measurement configuration information is broadcast in the system broadcast information of the current cell, the UE determines whether to obtain the measurement configuration information from the system broadcast, and if the UE determines to obtain the measurement configuration information from the system broadcast, the UE performs measurement according to the configuration information.

It should be understood that, in other alternative embodiments, when the terminal device does not store the first measurement configuration information, the terminal device may also stop the measurement, that is, the terminal device does not obtain the measurement configuration information from the system broadcast message. The terminal device may determine, based on the implementation of the terminal device, whether to obtain the measurement configuration information from the system broadcast message, and if so, the terminal device may perform measurement according to the measurement configuration information, and record the measurement result.

Third Embodiment

As an example, the first state is an inactive state, and the second state is a connected state.

Specifically, the terminal device sends an RRC connection resume request message to the network device; the terminal device receives a response message in response to an RRC connection resume request message and sent by a network device; the terminal device enters the connected state according to the response message.

As another example, the first state is an idle state, and the second state is a connected state.

Specifically, the terminal device sends an RRC connection establishment request message to the network device; the terminal device receives a response message in response to the RRC connection establishment request message and sent by the network device; the terminal device enters the connected state according to the response message.

According to some implementations, after the terminal device enters an active state from an inactive state or an idle state, a first measurement report obtained by the terminal device based on the first measurement configuration information may be reported to the network device.

Specifically, the terminal device may send third indication information to the network device, herein the third indication information is used to indicate that the terminal device stores a first measurement report obtained by the terminal device according to the first measurement configuration information; the terminal device receives a report request message sent by the network device; the terminal device sends the first measurement report to the network device according to the report request message.

In other words, the network device receives the third indication information sent by the terminal device, herein the third indication information is used to indicate that the terminal device stores the first measurement report obtained by the terminal device according to the first measurement configuration information; the network device sends a report request message to the terminal device, herein the report request message is used to request the terminal device to report the first measurement report to the network device; the network device receives the first measurement report sent by the terminal device.

According to some implementations, when the terminal device stores the first measurement configuration information the terminal device may release the first measurement configuration information at a certain moment.

For example, the terminal device releases the first measurement configuration information upon or after generating the first measurement report; or the terminal device releases the first measurement configuration information upon or after receiving the report request message; or the terminal device releases the first measurement configuration information upon or after sending the first measurement report.

For another example, the terminal device releases the first measurement configuration information after entering the connected state.

The embodiment of the present disclosure will be described below by taking the first state being the inactive state and the second state being the disconnected state as an example.

If the UE in the RRC_INACTIVE state initiates an RRC connection resume request message (RRCResumeRequest) to the network side, the UE receives the response message from the network side, and if the response message is an RRCResume message, the UE enters the RRC_CONNECTED state.

It is assumed that the UE stores the dedicated measurement configuration information or the measurement configuration information configured by the system broadcast.

According to some implementations, the UE receives the RRCResume message and enters the RRC_CONNECTED state, and the UE releases the measurement configuration information, regardless of whether it is a dedicated measurement configuration or the measurement configuration obtained from a system broadcast.

According to some implementations, the UE gives an indication to the network side that there is a measurement report corresponding to the measurement configuration, the network side issues a request for reporting the measurement report, and the UE reports the measurement report. After receiving a message of the request for reporting the measurement report issued by the network side, the UE stops the measurement, and releases the measurement configuration.

According to some implementations, the UE gives an indication to the network side that there is a measurement report corresponding to the measurement configuration, the network side issues a request for reporting the measurement report, and the UE reports the measurement report. Upon or after sending or constructing a message for reporting the measurement report, the UE stops the measurement, and releases the measurement configuration.

The present disclosure provides the maintenance relationship of the measurement configuration of the UE when the UE the is in the RRC state, which ensures that the measurement configuration is valid and the UE provides the optimal measurement result to the network side, shortening the time delay of the CA and MR-DC configuration, and improving the data transmission rate of the UE and system capacity.

The preferred embodiments of the present disclosure are described in detail above with reference to the accompanying drawings. However, the present disclosure is not limited to the specific details in the above-mentioned embodiments. Within the scope of the technical concept of the present disclosure, many simple modifications can be made to the technical solution of the present disclosure. All these simple modifications belong to the protection scope of the present disclosure.

For example, the various specific technical features described in the above specific embodiments can be combined in any suitable manner without contradiction. In order to avoid unnecessary repetition, the various possible combinations of the above specific embodiments will not be discussed in the present disclosure.

For another example, various different implementations of the present disclosure can also be combined arbitrarily, as long as the combinations do not violate the idea of the present disclosure, and the combinations should also be regarded as the content disclosed in the present disclosure.

It should be understood that in the various method embodiments of the present disclosure, the size of the sequence number of the foregoing processes does not mean the order of execution. The execution order of each process should be determined by its function and internal logic, but should not constitute any limitation to the implementation process of the present disclosure.

The method embodiments of the present disclosure are described in detail above with reference to FIGS. 1 to 9, and the apparatus embodiments of the present disclosure are described in detail below in conjunction with FIGS. 10 to 13.

Figure 10:
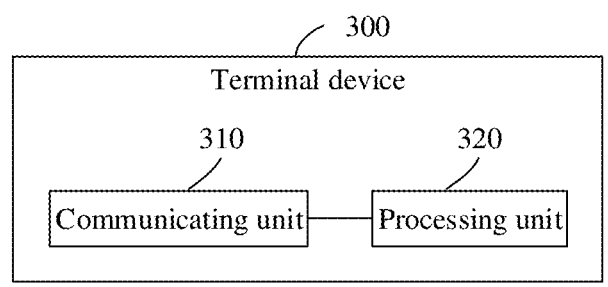
FIG. 10 is a schematic block diagram of a terminal device according to an embodiment of the present disclosure.

FIG. 10 is a schematic block diagram of a terminal device 300 according to an embodiment of the present disclosure.

Specifically, as shown in FIG. 10, the terminal device 300 may include:

a communicating unit 310, configured to enter a second state from a first state.

a processing unit 320, configured to perform the following:
  when the terminal device stores first measurement configuration information used by the terminal device in the first state, releasing, reserving or updating the first measurement configuration information; and/or
when the terminal device does not store the first measurement configuration information, obtaining second measurement configuration information used by the terminal device in the second state,
herein, the first state is an idle state or an inactive state, the second state is any one of an idle state, an inactive state or a connected state, herein the measurement configuration information is used by the terminal device to obtain a measurement result. According to some implementations, the measurement result is used by a network device to perform carrier aggregation (CA) and/or dual connectivity (DC) configuration.

According to some implementations, in some embodiments of the present disclosure, the first state is an inactive state, and the second state is an inactive state or an idle state, herein the communicating unit 310 is specifically configured to:
  send an RRC connection resume request message to the network device;
  receive a response message in response to the RRC connection resume request message and sent by the network device; and
  enter an inactive state or an idle state according to the response message.

According to some implementations, in some embodiments of the present disclosure, the terminal device stores the first measurement configuration information.

According to some implementations, in some embodiments of the present disclosure, the processing unit 320 is specifically configured to perform the following:
  when the response message includes first indication information, releasing the first measurement configuration information, herein the first indication information is used to instruct the terminal device to release the first measurement configuration information; and/or, when the response message does not include the first indication information, reserve or update the first measurement configuration information.

According to some implementations, in some embodiments of the present disclosure, the processing unit 320 is specifically configured to perform the following:
  when the response message includes the second measurement configuration information, utilizing the second measurement configuration information to update the first measurement configuration information; and/or when the response message does not include the second measurement configuration information, releasing or reserving the first measurement configuration information.

According to some implementations, in some embodiments of the present disclosure, the processing unit 320 is specifically configured to perform the following:
  when the first measurement configuration information belongs to a dedicated RRC signaling, reserving the first measurement configuration information; and/or, when the first measurement configuration information belongs to a system broadcast message, releasing or updating the first measurement configuration information.

According to some implementations, in some embodiments of the present disclosure, the communicating unit 310 is further configured to:

receive a system broadcast message, herein, the processing unit 320 is specifically configured to perform the following:

when the system broadcast message includes third measurement configuration information, utilizing the third measurement configuration information to update the first measurement configuration information; and/or when the system broadcast message does not include the third measurement configuration information, reserving or releasing the first measurement configuration information.

According to some implementations, in some embodiments of the present disclosure, the first state is an inactive state, and the second state is an idle state, herein the communicating unit 310 is specifically configured to:

trigger the terminal device to enter an idle state through any of the following events:

an initial paging message sent by a Core Network (CN) is received;

a timer is started when an RRC connection resume request message is sent to the network device, and the timer expires;

verification of integrity protection of a message 4 (MSG4) fails;

a cell using another Radio Access Technology (RAT) is reselected; and the terminal device enters a state of camping on any cell.

According to some implementations, in some embodiments of the present disclosure, the terminal device stores the first measurement configuration information.

According to some implementations, in some embodiments of the present disclosure, the processing unit 320 is specifically configured to perform the following:

when the first measurement configuration information belongs to a dedicated RRC signaling, reserving the first measurement configuration information; and/or when the first measurement configuration information belongs to a system broadcast message, releasing or updating the first measurement configuration information.

According to some implementations, in some embodiments of the present disclosure, the processing unit 320 is more specifically configured to:

when the first measurement configuration information belongs to a dedicated RRC signaling, reserve the first measurement configuration information, and until the timer of the first measurement configuration information stops or expires or after the timer of the first measurement configuration information stops or expires, release or update the first measurement configuration information.

According to some implementations, in some embodiments of the present disclosure, the communicating unit 310 is further configured to:

receive a system broadcast message, herein, the processing unit 320 is specifically configured to perform the following:

when the system broadcast message includes third measurement configuration information, utilizing the third measurement configuration information to update the first measurement configuration information; and/or when the system broadcast message does not include the third measurement configuration information, reserving or releasing the first measurement configuration information.

According to some implementations, in some embodiments of the present disclosure, the terminal device does not store the first measurement configuration information.

According to some implementations, in some embodiments of the present disclosure, the communicating unit 310 is further configured to:

receive a system broadcast message, herein, the processing unit 320 is specifically configured to:

when the system broadcast message includes third measurement configuration information, determine the third configuration information as the second configuration information.

According to some implementations, in some embodiments of the present disclosure, the communicating unit 310 is further configured to:

receive second indication information sent by the network device, herein the second indication information is used to instruct the terminal device to obtain the second measurement configuration information from a system broadcast message.

According to some implementations, in some embodiments of the present disclosure, the first state is an inactive state, and the second state is a connected state, herein the communicating unit 310 is specifically configured to:

send an RRC connection resume request message to the network device;

receive a response message in response to an RRC connection resume request message and sent by the network device; and enter a connected state according to the response message.

According to some implementations, in some embodiments of the present disclosure, the first state is an idle state, and the second state is a connected state herein the communicating unit 310 is specifically configured to:

send an RRC connection establishment request message to the network device;

receive a response message in response to the RRC connection establishment request message and sent by the network device; and enter a connected state according to the response message.

According to some implementations, in some embodiments of the present disclosure, the communicating unit 310 is further configured to:

send third indication information to the network device, herein the third indication information is used to indicate that the terminal device stores a first measurement report obtained by the terminal device according to the first measurement configuration information;

receive a report request message sent by the network device; and send the first measurement report to the network device according to the report request message.

According to some implementations, in some embodiments of the present disclosure, the terminal device stores the first measurement configuration information.

According to some implementations, in some embodiments of the present disclosure, the processing unit 320 is specifically configured to:

release the first measurement configuration information upon or after generating the first measurement report; or release the first measurement configuration information upon or after receiving the report request message; or release the first measurement configuration information upon or after sending the first measurement report.

According to some implementations, in some embodiments of the present disclosure, the processing unit 320 is specifically configured to:
  release the first measurement configuration information after entering a connected state.

According to some implementations, in some embodiments of the present disclosure, the processing unit 320 is specifically configured to:
  when the terminal device does not store the first measurement configuration information and the second state is an idle state or an inactive state, obtain the second measurement configuration information.

According to some implementations, in some embodiments of the present disclosure, the processing unit 320 is further configured to:
  obtain a second measurement report according to the second measurement configuration information.

It should be understood that the apparatus embodiments and the method embodiments may correspond to each other, and similar descriptions may refer to the method embodiments. Specifically, the terminal device 300 shown in FIG. 10 may correspond to a corresponding subject in the method 200 that executes the embodiment of the present disclosure, and the foregoing and other operations and/or functions of each unit in the terminal device 300 are respectively intended to realize the corresponding procedures in each method in FIG. 9. For the sake of brevity, details are not repeated here.

Figure 11:
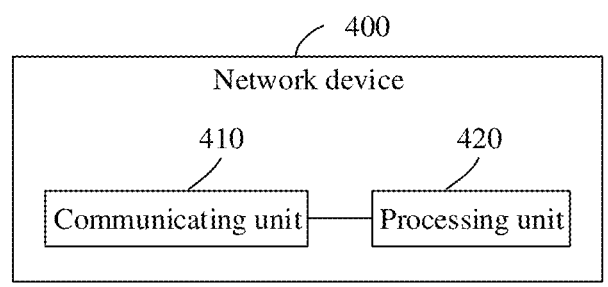
FIG. 11 is a schematic block diagram of a network device according to an embodiment of the present disclosure.

FIG. 11 is a schematic block diagram of a network device according to an embodiment of the present disclosure.

As shown in FIG. 11, the network device may include:
  a communicating unit 410, configured to control a terminal device to enter a second state from a first state;
  a processing unit 420, configured to generate and send first indication information, herein the first indication information is used to instruct the terminal device to release first measurement configuration information used by the terminal device in the first state,
  herein, the first state is an idle state or an inactive state, the second state is any one of an idle state, an inactive state or a connected state, herein the measurement configuration information is used by the terminal device to obtain a measurement result.

According to some implementations, the measurement result is used by the network device to perform at least one of carrier aggregation (CA) configuration or dual connectivity (DC) configuration.

According to some implementations, in some embodiments of the present disclosure, the first state is an inactive state, and the second state is an inactive state or an idle state, herein the communicating unit 410 is specifically configured to:
  receive an RRC connection resume request message sent by the terminal device; and
  send a response message of the RRC connection resume request message to the terminal device, so that the terminal device enters an inactive state or an idle state according to the response message.

According to some implementations, in some embodiments of the present disclosure, the response message includes the first indication information.

According to some implementations, in some embodiments of the present disclosure, the response message includes second measurement configuration information used by the terminal device in the second state.

According to some implementations, in some embodiments of the present disclosure, the processing unit 420 is further configured to:
  generate and send second indication information, herein the second indication information is used to instruct the terminal device to obtain, from a system broadcast message, second measurement configuration information used by the terminal device in the second state.

According to some implementations, in some embodiments of the present disclosure, the second state is a connected state.

According to some implementations, in some embodiments of the present disclosure, the processing unit 420 is further configured to:
  receive third indication information sent by the terminal device, herein the third indication information is used to indicate that the terminal device stores a first measurement report obtained by the terminal device according to the first measurement configuration information;
  send a report request message to the terminal device, herein the report request message is used to request the terminal device to report the first measurement report to the network device; and
  receive the first measurement report sent by the terminal device.

The communication device in the embodiment of the present disclosure is described above from the perspective of functional modules in conjunction with FIG. 10 and FIG. 11. It should be understood that the functional module can be implemented in the form of hardware, instructions in the form of software, or a combination of hardware and software modules.

Specifically, the operations of the method embodiments in the embodiments of the present disclosure can be completed by hardware integrated logic circuits in the processor and/or instructions in the form of software, and the operations of the methods disclosed in the embodiments of the present disclosure can be directly embodied as being executed and completed by a hardware decoding processor, or being executed and completed by a combination of hardware and software modules in a decoding processor.

According to some implementations, the software module may be located in a mature storage medium in the field, such as a random access memory, a flash memory, a read-only memory, a programmable read-only memory, an electrically erasable programmable memory, and a register. The storage medium is located in the memory, and the processor reads the information in the memory, and completes the operations in the foregoing method embodiments in combination with its hardware.

For example, the communicating unit mentioned above may be implemented by a transceiver, and the processing unit mentioned above may be implemented by a processor.

Figure 12:
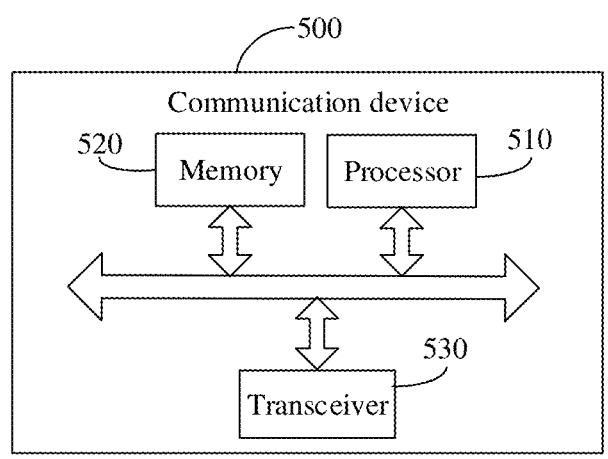
FIG. 12 is a schematic block diagram of a communication device according to an embodiment of the present disclosure.

FIG. 12 is a schematic structural diagram of a communication device 500 according to an embodiment of the present disclosure. The communication device 500 shown in FIG. 12 includes a processor 510, herein the processor 510 can invoke and run computer programs from a memory to implement the method in the embodiment of the present disclosure.

According to some implementations, as shown in FIG. 12, the communication device 500 may further include a memory 520. The memory 520 may be used to store indication information, and may also be used to store codes and instructions executed by the processor 510. The processor 510 may invoke and run computer programs from the memory 520 to implement the method in the embodiment of the present disclosure.

The memory 520 may be separate equipment independent of the processor 510, or may be integrated in the processor 510.

According to some implementations, as shown in FIG. 12, the communication device 500 may further include a transceiver 530, and the processor 510 may control the transceiver 530 to communicate with other devices. Specifically, the transceiver 530 may send information or data to other devices, or receive information or data sent by other devices.

The transceiver 530 may include a transmitter and a receiver. The transceiver 530 may further include an antenna, and the number of antennas may be one or more.

According to some implementations, the communication device 500 may be a terminal device in the embodiment of the present disclosure, and the communication device 500 may implement the corresponding procedures implemented by the terminal device in each method in the embodiment of the present disclosure. In other words, the communication device 500 in the embodiment of the present disclosure may correspond to the terminal device 300 in the embodiment of the present disclosure, and may correspond to a corresponding subject executing the method 200 according to the embodiment of the present disclosure. For the sake of brevity, details are not repeated here.

According to some implementations, the communication device 500 may be a network device in the embodiment of the present disclosure, and the communication device 500 may implement the corresponding procedures implemented by the network device in each method in the embodiments of the present disclosure. In other words, the communication device 500 in the embodiment of the present disclosure may correspond to the network device 400 in the embodiment of the present disclosure, and may correspond to the corresponding subject executing the method 200 according to the embodiment of the present disclosure. For the sake of brevity, details are not repeated here.

It should be understood that the various components in the communication device 500 are connected by a bus system. In addition to a data bus, the bus system also includes a power bus, a control bus, and a state signal bus.

In addition, an embodiment of the present disclosure also provides a chip, which may be an integrated circuit chip with signal processing capability, and can implement or perform the methods, operations, and logic block diagrams disclosed in the embodiments of the present disclosure.

According to some implementations, the chip can be applied to various communication devices, so that the communication device installed with the chip can perform the methods, operations, and logical block diagrams disclosed in the embodiments of the present disclosure.

Figure 13:
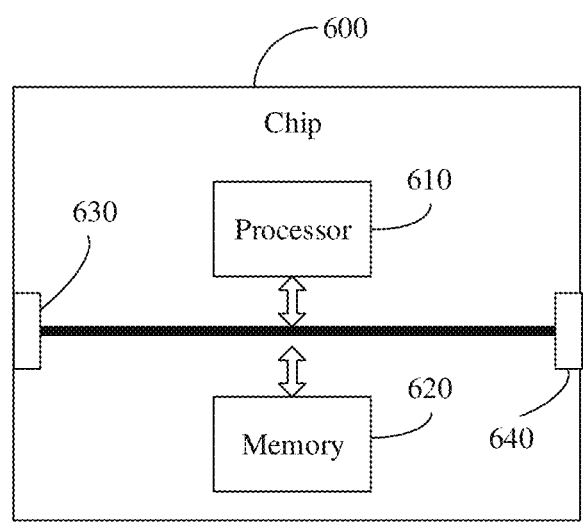
FIG. 13 is a schematic block diagram of a chip according to an embodiment of the present disclosure.

FIG. 13 is a schematic structural diagram of a chip according to an embodiment of the present disclosure.

The chip 600 shown in FIG. 13 includes a processor 610, and the processor 610 can invoke and run computer programs from the memory to implement the method in the embodiment of the present disclosure.

According to some implementations, as shown in FIG. 13, the chip 600 may further include a memory 620. The processor 610 may invoke and run computer programs from the memory 620 to implement the method in the embodiment of the present disclosure. The memory 620 may be used to store indication information, and may also be used to store codes and instructions executed by the processor 610.

The memory 620 may be separate equipment independent of the processor 610, or may be integrated in the processor 610.

According to some implementations, the chip 600 may further include an input interface 630. The processor 610 can control the input interface 630 to communicate with other devices or chips. Specifically, the processor 610 can control the input interface 630 to obtain information or data sent by other devices or chips.

According to some implementations, the chip 600 may further include an output interface 640. The processor 610 can control the output interface 640 to communicate with other devices or chips. Specifically, the processor 610 can control the output interface 640 to output information or data to other devices or chips.

According to some implementations, the chip can be applied to the network device in the embodiment of the present disclosure, and the chip can implement the corresponding procedures implemented by the network device in each method of the embodiment of the present disclosure. For the sake of brevity, details are not described herein again.

According to some implementations, the chip can be applied to the terminal device in the embodiment of the present disclosure, and the chip can implement the corresponding procedures implemented by the terminal device in each method of the embodiment of the present disclosure. For the sake of brevity, details are not described herein again.

It should be understood that the chips mentioned in the embodiments of the present disclosure may also be referred to as system-level chips or system-on-chips. It should also be understood that the various components in the chip 600 are connected by a bus system. In addition to a data bus, the bus system also includes a power bus, a control bus, and a state signal bus.

The processor may include but is not limited to the followings.

General-purpose processors, digital signal processors (DSP), application specific integrated circuits (ASIC), field programmable gate arrays (FPGA) or other programmable logic devices, discrete gates or transistor logic equipment, discrete hardware components, etc.

The processor may be used to implement or perform the methods, operations, and logical block diagrams disclosed in the embodiments of the present disclosure. The operations of the method disclosed in the embodiments of the present disclosure may be directly embodied as being executed and completed by a hardware decoding processor, or being executed and completed by a combination of hardware and software modules in the decoding processor. The software module can be located in a mature storage medium in the field such as a random access memory, a flash memory, a read-only memory, a programmable read-only memory or an erasable programmable memory and a register. The storage medium is located in the memory, and the processor reads the information in the memory and completes the operations of the above method in combination with its hardware.

The storage includes but is not limited to the followings.

A volatile memory and/or a non-volatile memory. The non-volatile memory can be a read-only memory (ROM), a programmable read-only memory (PROM), an erasable PROM (EPROM), an electrically EPROM (EEPROM) or a flash memory. The volatile memory may be a random access memory (RAM), which is used as an external cache. By way of exemplary but not restrictive description, many forms of the RAM are available, such as a static RAM (SRAM), a dynamic RAM (DRAM), and a synchronous DRAM (SDRAM), a double data rate SDRAM (DDR SDRAM), an enhanced SDRAM (ESDRAM), a synch link DRAM (SLDRAM) and a direct rambus RAM (DR RAM).

It should be noted that the memories of the systems and methods described herein are intended to include, but are not limited to, these and any other suitable types of memories.

The embodiment of the present disclosure also provides a computer-readable storage medium for storing computer programs. The computer-readable storage medium stores one or more programs, and the one or more programs include instructions that, when being executed by a portable electronic device including multiple application programs, can cause the portable electronic device to implement the method of embodiments shown in method 200.

According to some implementations, the computer-readable storage medium can be applied to the network device in the embodiment of the present disclosure, and the computer programs cause the computer to perform the corresponding procedures implemented by the network device in each method of the embodiment of the present disclosure. For the sake of brevity, details are not repeated here.

According to some implementations, the computer-readable storage medium may be applied to the mobile terminal/terminal device in the embodiment of the present disclosure, and the computer programs cause the computer to execute the corresponding procedures implemented by the mobile terminal/terminal device in each method of the embodiment of the present disclosure. For the sake of brevity, details are not repeated here.

The embodiment of the present disclosure also provides a computer program product, including computer programs.

According to some implementations, the computer program product can be applied to the network device in the embodiment of the present disclosure, and the computer programs cause the computer to execute the corresponding procedures implemented by the network device in each method of the embodiment of the present disclosure. For the sake of brevity, details are not repeated here.

According to some implementations, the computer program product can be applied to the mobile terminal/terminal device in the embodiment of the present disclosure, and the computer programs cause the computer to execute the corresponding procedures implemented by the mobile terminal/terminal device in each method of the embodiment of the present disclosure. For the sake of brevity, details are not repeated here.

The embodiment of the present disclosure also provides a computer program. When the computer program runs on a computer, the computer is caused to perform the methods in the embodiments shown in method 300 to method 500.

According to some implementations, the computer program can be applied to the network device in the embodiment of the present disclosure. When the computer program runs on a computer, the computer is caused to perform the corresponding procedures implemented by the network device in each method of the embodiment of the present disclosure. For the sake of brevity, details are not repeated here.

The embodiment of the present disclosure also provides a communication system. The communication system may include a terminal device 810 as shown in FIG. 8 and a network device 820 as shown in FIG. 8. The terminal device 810 may be used to implement the corresponding functions implemented by the terminal device in the above methods xx to xx, and the network device 820 may be used to implement the corresponding functions implemented by the network device in the above methods xx to xx. For the sake of brevity, details are not repeated here.

It should be noted that the term "system" in the present disclosure can also be referred to as "network management architecture" or a "network system".

It should also be understood that the terms used in the embodiments of the present disclosure and the appended claims are only for the purpose of describing specific embodiments, but are not intended to limit the embodiments of the present disclosure.

For example, the singular forms "a/an", "the" and "above-mentioned" used in the present disclosure and appended claims are also intended to include plural forms, unless the context clearly indicates other meanings.

Those skilled in the art may be aware that the units and algorithm operations of the examples described in the embodiments disclosed herein may be implemented by electronic hardware or a combination of computer software and electronic hardware. Whether these functions are executed by hardware or software depends on the specific application and design constraints of the technical solution. Professionals and technicians can use different methods to implement the described functions of each specific application, but such implementation should not be considered beyond the scope of the disclosure.

If the units and algorithm operations of the examples described in the embodiments disclosed herein are implemented in the form of a software functional unit and sold or used as an independent product, they can be stored in a computer readable storage medium. Based on such an understanding, the technical solutions of the embodiments of the present disclosure or the part that contributes to the prior art or the part of the technical solutions can be essentially embodied in the form of a software product, and the computer software product is stored in a storage medium including several instructions to cause a computer device (which can be a personal computer, a server, or a network device, etc.) to perform all or part of the operations of the method described in the embodiments of the present disclosure. The aforementioned storage medium may be various media that can store program codes, such as: a U disk, a mobile hard disk, a read-only memory, a random access memory, a magnetic disk and an optical disk.

Those skilled in the art can clearly understand that, for convenience and concise description, the specific working process of the above-described system, apparatus and unit can refer to the corresponding process in the foregoing method embodiment, and details are not described herein again.

In the several embodiments provided in the present disclosure, it should be understood that the disclosed system, apparatus and method may be implemented in other ways.

For example, the division of the units or modules or components in the apparatus embodiments described above is only a logical function division, and there may be other divisions in actual implementation. For example, multiple units or components may be combined or integrated into another system, or some features may be ignored or not implemented.

For another example, the units/modules/components described as separate/displayed components may or may not be physically separated, that is, they may be located in one place, or they may be distributed on multiple network units. Some or all of the units/modules/components may be selected according to actual needs to achieve the objectives of the solutions of the present embodiments.

Finally, it should be noted that the displayed or discussed mutual coupling or direct coupling or communication connection may be indirect coupling or communication connection through some interfaces, apparatuses or units, and may be in electrical, mechanical or other forms.

The foregoing is only the specific implementation mode of the disclosure. However, the protection scope of the disclosure is not limited thereto. Any variations or replacements apparent to those skilled in the art within the technical scope disclosed by the present disclosure shall fall within the protection scope of the present disclosure. Therefore, the protection scope of the disclosure shall be subject to the protection scope of the claims.

The invention claimed is:

1. A method for wireless communication, comprising:
   entering, by a terminal device, a second state from a first state;
   when the terminal device stores first measurement configuration information used by the terminal device in the first state, releasing, reserving or updating, by the terminal device, the first measurement configuration information based on a determination of whether a system broadcast message, received by the terminal device, includes a third measurement configuration information;
   when the terminal device does not store the first measurement configuration information, obtaining, by the terminal device, second measurement configuration information used by the terminal device in the second state,
   wherein the first state is an idle state or an inactive state, the second state is any one of an idle state or an inactive state, and the first or second measurement configuration information is used by the terminal device to obtain a measurement result,
   wherein releasing, reserving or updating, by the terminal device, the first measurement configuration information comprises:
      when the system broadcast message comprises the third measurement configuration information, utilizing, by the terminal device, the third measurement configuration information to update the first measurement configuration information;
      when the system broadcast message does not comprise third measurement configuration information, reserving or releasing, by the terminal device, the first measurement configuration information.

2. The method of claim 1, wherein the first state is an inactive state, and the second state is an inactive state or an idle state, wherein entering, by the terminal device, the second state from the first state comprises:
   sending, by the terminal device, a Radio Resource Control (RRC) connection resume request message to a network device;
   receiving, by the terminal device, a response message in response to the RRC connection resume request message and sent by the network device; and
   entering, by the terminal device, an inactive state or an idle state according to the response message.

3. The method of claim 2, wherein releasing, reserving or updating, by the terminal device, the first measurement configuration information comprises:
   when the response message comprises first indication information, releasing, by the terminal device, the first measurement configuration information, wherein the first indication information is used to instruct the terminal device to release the first measurement configuration information; when the response message does not comprise first indication information, reserving or updating, by the terminal device, the first measurement configuration information.

4. The method of claim 2,
   wherein obtaining, by the terminal device, second measurement configuration information used by the terminal device in the second state comprises:
      when the system broadcast message comprises the third measurement configuration information, determining, by the terminal device, the third configuration information as the second configuration information.

5. The method of claim 1, wherein the first state is an inactive state and the second state is an idle state, wherein entering, by the terminal device, the second state from the first state comprises:
   triggering the terminal device to enter an idle state through any of the following events:
      an initial paging message sent by a Core Network (CN) is received;
      a timer is started when an RRC connection resume request message is sent to the network device, and the timer expires;
      verification of integrity protection of a message 4 (MSG4) fails;
      a cell using another Radio Access Technology (RAT) is reselected; or
      a state of camping on any cell is entered.

6. The method of claim 5, wherein releasing, reserving or updating, by the terminal device, the first measurement configuration information comprises:
   when the first measurement configuration information belongs to a dedicated RRC signaling, reserving, by the terminal device, the first measurement configuration information;
   when the first measurement configuration information belongs to the system broadcast message, releasing or updating, by the terminal device, the first measurement configuration information.

7. The method of claim 6, wherein releasing, reserving or updating, by the terminal device, the first measurement configuration information comprises:
   when the first measurement configuration information belongs to a dedicated RRC signaling, reserving, by the terminal device, the first measurement configuration information, and until a timer of the first measurement configuration information stops or expires or after the timer of the first measurement configuration information stops or expires, releasing or updating, by the terminal device, the first measurement configuration information.

8. The method of claim 1, further comprising:
   obtaining, by the terminal device, a second measurement report according to the second measurement configuration information.

9. The method of claim 1, wherein the measurement result is used by a network device to perform at least one of carrier aggregation (CA) or dual connectivity (DC) configuration.

10. A method for wireless communication, comprising:
    controlling, by a network device, a terminal device to enter a second state from a first state;
    generating and sending, by the network device, first indication information, wherein the first indication information is used to instruct the terminal device to release first measurement configuration information used by the terminal device in the first state, wherein releasing the first measurement configuration information is based on a determination of whether a system broadcast message, received by the terminal device, includes a third measurement configuration information, wherein the first state is an idle state or an inactive state, the second state is any one of an idle state or an inactive state, and wherein the first or second measurement configuration information is used by the terminal device to obtain a measurement result, wherein when the system broadcast message comprises the third measurement configuration information, the third measurement configuration information is utilized by the terminal device to update the first measurement configuration information;

when the system broadcast message does not comprise third measurement configuration information, the first measurement configuration information is released by the terminal device.

11. A network device, comprising:

a memory storing processor-executable instructions; and a processor configured to execute the stored processor-executable instructions to perform operations of the method for wireless communication of claim 10.

12. A terminal device, comprising:

a memory storing processor-executable instructions; and a processor configured to execute the stored processor-executable instructions to perform operations of:

entering a second state from a first state;

when the terminal device stores first measurement configuration information used by the terminal device in the first state, releasing, reserving or updating the first measurement configuration information, wherein releasing the first measurement configuration information is based on a determination of whether a system broadcast message, received by the terminal device, includes a third measurement configuration information;

when the terminal device does not store the first measurement configuration information, obtaining second measurement configuration information used by the terminal device in the second state, wherein the first state is an idle state or an inactive state, the second state is any one of an idle state or an inactive state, wherein the first or second measurement configuration information is used by the terminal device to obtain a measurement result, wherein releasing, reserving or updating the first measurement configuration information comprises:

when the system broadcast message comprises the third measurement configuration information, utilizing the third measurement configuration information to update the first measurement configuration information;

when the system broadcast message does not comprise third measurement configuration information, reserving or releasing the first measurement configuration information.

* * * * *